United States Patent [19]

Yoon et al.

[11] Patent Number: 5,790,537
[45] Date of Patent: Aug. 4, 1998

[54] INTERFERENCE SUPPRESSION IN DS-CDMA SYSTEMS

[75] Inventors: Young C. Yoon; Harry Leib, both of Montreal, Canada

[73] Assignee: McGill University, Montreal, Canada

[21] Appl. No.: 647,731

[22] Filed: May 15, 1996

[51] Int. Cl.$^6$ .................................................. H04B 7/216
[52] U.S. Cl. .......................... 370/342; 370/441; 375/206; 375/207; 375/208
[58] Field of Search .................................. 370/320, 328, 370/335, 342, 441; 375/205, 206, 207, 208; 455/501, 63, 67.3

[56] References Cited

U.S. PATENT DOCUMENTS

| | | | |
|---|---|---|---|
| 5,341,395 | 8/1994 | Bi | 375/1 |
| 5,343,496 | 8/1994 | Honig et al. | 375/202 |
| 5,345,468 | 9/1994 | Bi | 375/1 |
| 5,345,472 | 9/1994 | Lee | 375/202 |
| 5,353,300 | 10/1994 | Lee et al. | 375/1 |
| 5,353,302 | 10/1994 | Bi | 375/1 |
| 5,363,403 | 11/1994 | Schilling et al. | 375/1 |
| 5,377,225 | 12/1994 | Davis | 375/1 |
| 5,377,226 | 12/1994 | Davis | 375/1 |
| 5,381,447 | 1/1995 | Ayerst et al. | 375/1 |
| 5,625,640 | 4/1997 | Palmer et al. | 375/202 |
| 5,640,416 | 6/1997 | Chalmers | 375/206 |
| 5,648,983 | 7/1997 | Kostic et al. | 375/206 |

OTHER PUBLICATIONS

*Minimum Probability of Error for Asynchronous Gaussian Multiple–Access Channels*, Sergio Verdú, IEEE Transactions on Information Theory, vol. IT–32, No. 1, Jan. 1986, pp. 85–95.

*Matched Filters for Locked and Unlocked Interferers in DS-CDMA*, by Young C. Yoon and Harry Leib Proc. of IEEE Pacific Rim Conference on Communications, Computers and Signal Processing, May 17–19, 1995 Victoria, BC, Canada, pp. 449–452.

*Multistage Detection in Asynchronous Code–Division Multiple–Access Communications*, Mahesh K. Varanasi and Behnaam Aazhang, IEEE Transactions on Communications, vol. 38, No. 4, Apr. 1990, pp. 509–519.

*A Family of Suboptimum Detectors for Coherent Multiuser Communications*, Zhenhua Xie, Robert T. Short and Craig K. Rushforth, IEEE Journal on Selected Areas in Communications, vol. 8, No. 4, May 1990, pp. 683–690.

*A Noise–Whitening Approach to Multiple Access Noise Rejection–Part I: Theory and Background*, Anton M. Monk, Mark Davis, Laurence B. Milstein and Carl W. Helstrom, IEEE Journal on Selected Areas in Communications, vol. 12, No. 5, Jun. 1994, pp. 817–827.

*MMSE Interference Suppression for Direct–Sequence Spread–Spectrum CDMA*, Upamanyu Madhow and Michael L. Honig, IEEE Transactions on Communications, vol. 42, No. 12, Dec. 1994, pp. 3178–3188.

*Multiuser Detection of CDMA Systems*, Alexandra Duel–Hallen, Jack Holtzman and Zoran Zvonar, IEEE Personal Communications vol. 2, No. 2, Apr.1995, pp. 46–58.

*Primary Examiner*—Chi H. Pham
*Assistant Examiner*—Ricky Q. Ngo
*Attorney, Agent, or Firm*—Thomas Adams

[57] ABSTRACT

A code division multiple access (CDMA) communications system comprises a plurality of CDMA transmitters and at least one reception station coupled together by a communications channel. Each CDMA transmitter encodes a digital signal with a spreading code, each bit of the digital signal being encoded by a spreading code segment comprising a multiplicity of chips. All of the transmitters transmit their respective encoded signals to the reception station asynchronously via the communications channel so as to occupy the same bandwidth. Each receiver receives the combined signals of all of the transmitters and correlates it with a selected one of the spreading code segments to detect the digital signal from the corresponding transmitter. Each receiver uses also the signal-to-noise ratios of detected signals other than its own, with respect to chip delays relative to a reference one of the signals, to suppress multiple access interference (MAI) caused by such other detected signals.

16 Claims, 9 Drawing Sheets ns/#5,790,537

INTERFERENCE SUPPRESSION IN DS-CDMA SYSTEMS

BACKGROUND OF THE INVENTION

1. Technical Field

The invention relates to direct-sequence code-division multiple-access (DS-CDMA) communications systems and is especially concerned with demodulating code division multiple access signals in such systems while suppressing multi-access (MAI) interference in a multi-user communication channel.

The invention is especially, but not exclusively, applicable to personal, indoor and mobile communication systems which provide wireless access to multiple users.

2. Background Art

In known DS-CDMA communications systems, a multiplicity of transmitters, which may be mobile as in cellular telephone systems, transmit signals to at least one base or reception station by way of a common communications channel. In contrast to systems which segregate signals from the different transmitters by frequency division or time division multiplexing, a DS-CDMA system uses spread spectrum techniques so that all of the signals from the different transmitters may simultaneously occupy the same bandwidth. Each transmitter combines with its digital data signal, before transmission, a spreading code which comprises a sequence of bits unique to that transmitter. Typically, the spreading code is a sequence of bits at a rate which is significantly higher than the bit rate of the data signal. The spreading code could, however, be complex numbers of unit magnitude. In this specification, the term "chips" will be used to refer to the bits produced by combining the bits of the digital data signal with the elements of the spreading code, so as to distinguish them from the bits of the digital data signal.

The reception station comprises a plurality of receivers, each corresponding to one of the plurality of transmitters. All of the receivers receive the same received signal comprising the combined signals from all of the transmitters. In order to detect the signal from its corresponding transmitter, each receiver must suppress not only noise arising from the transmission path and components, but also so-called "multi-access interference" (MAI) comprising the signals from the other transmitters. Typically, the receiver uses a matched filter or other correlation device to correlate the received signal with the receiver's own version of the code sequence unique to that transmitter. The signal from the corresponding transmitter will show a high degree of correlation and be detected. The signals from the other transmitters will show a very low correlation and be rejected.

Various techniques have been proposed for demodulating DS-CDMA signals in the presence of this multi-access interference (MAI). For example, U.S. Pat. No. 5,377,226 (Davis) discloses a receiver which uses a matched filter and an adaptive linear filter. The adaptive linear filter compensates for the non-flat power spectrum and for signal distortions. Because Davis' system does not require each receiver to know the spreading codes and chip timing of the signals of other users, it is relatively simple. However, it is not particularly resistant to "near-far" problems which can arise when there is a large difference in the received power levels and one or more high-power transmissions tend to overpower low power signals, reducing the ability of the receiver to detect the low power signal. For example, the problem could arise in a multi-data rate CDMA system in which users may transmit at various data rates while maintaining a common chip rate. The users could transmit at various processing gains and signals powers.

So-called "optimum" and "sub-optimum" multi-user receivers achieve better performance and resistance to "near-far" problems, but they are very complex and difficult to implement since they utilize precise knowledge of the time delays, signal strengths and spreading sequences for all of the transmitters. Their detectors have a computational complexity that increases either linearly or exponentially with the total number of users.

In an article entitled "MMSE Interference Suppression for Direct-Sequence Spread-Spectrum CDMA", IEEE Transactions on Communications, Vol. COM-42, no. 12, Dec. 1994, pp. 3178–3188, M. L. Honig and U. Madhow disclose both a linear, minimum squared error multi-user detector and its adaptive version. The former is not entirely satisfactory because it requires bit delays, signal powers and spreading sequence information for all of the users to be used in detecting each signal. The adaptive version, which is the subject of their U.S. Pat. No. 5,343,496, does not require parameter information for the interfering users. It requires only a preamble training sequence to adjust adaptive filter coefficients. Although such an approach might be suitable for use with a fairly stable channel it is not entirely satisfactory in a multiple-access system where MAI may change rapidly as users connect to and disconnect from the system. Each time the MAI changes, there will be a period during which the number of incorrect bit decisions may jump as the filter coefficients converge. Moreover, its transmitters employ the same spreading sequence to spread each data bit, which precludes use in those CDMA systems which deploy channel coding and/or use extremely long spreading sequences to spread a large number of bits.

SUMMARY OF THE INVENTION

An object of the present invention is to eliminate, or at least mitigate, the disadvantages of known code-division multiple-access communication systems and receivers and to provide a DS-CDMA reception station apparatus, and corresponding demodulation method, which utilize less information about the interfering transmissions than known DS-CDMA receivers capable of equivalent performance.

Thus, according to one aspect of the present invention, reception station apparatus for a code-division multiple-access (CDMA) communications system comprises a plurality of CDMA transmitters and at least one such reception station apparatus coupled together by a communications channel. Each transmitter encodes a respective one of a corresponding plurality of digital signals with a spreading code unique to that transmitter. Each bit of the digital signal is encoded by a spreading code sequence comprising a multiplicity of elements to provide a corresponding multiplicity of chips. All of the transmitters are arranged to transmit their respective encoded signals to the reception station apparatus asynchronously via the communications channel so as to occupy the same bandwidth. The reception station apparatus comprises a plurality of receivers corresponding to at least a subset of the transmitters. The receivers are connected to receive, in common, a received signal comprising all of the encoded signals from the plurality of transmitters. Each receiver comprises a correlation unit for correlating the received signal with the spreading code sequence of the corresponding one of the transmitters to provide a detected signal, a sampling unit for sampling the detected signal to provide an estimated digital signal, and a synchronisation unit for providing a bit clock in dependence upon the timing of the detected signal. The reception station apparatus further comprises processor means responsive to the plurality of receivers for providing a plurality of power level signals each representing a power level for a respective one of the detected signals and a plurality of chip delay signals each representing a chip delay of a respective one of the detected signals relative to a reference one of the bit clocks, the correlation means of the plurality of receivers each being responsive to parameters derived from said power level signals and said chip delay signals in correlating its own spreading code sequence with the received signal.

Preferably, the apparatus comprises means for subdividing a chip duration of a reference one of the detected signals to provide a set of chip intervals and means for computing, for each interval, net SNR ratios of detected signals which have chip delays corresponding to that interval.

Specific embodiments of the invention advantageously provide a DS-CDMA reception apparatus, and corresponding method, for a system in which said spreading code sequences comprise segments of a long spreading code, a different segment being used for each bit being encoded.

According to a second aspect of the invention, there is provided a method of demodulating received signals received at a reception station of a code division multiple access (CDMA) communications system comprising a plurality of CDMA transmitters coupled to such reception station apparatus by a communications channel, each transmitter being arranged to encode a respective one of a corresponding plurality of digital signals with a spreading code unique to that transmitter, each bit of the digital signal being encoded by a spreading code sequence comprising a multiplicity of elements to provide a corresponding multiplicity of chips, all of the transmitters transmitting their respective encoded signals to the reception station asynchronously via the communications channel so as to occupy the same bandwidth, the reception station comprising a plurality of receivers corresponding to at least a subset of the transmitters, the receivers being connected to receive, in common, a received signal comprising all of the encoded signals from the plurality of transmitters, the method comprising the steps of correlating the received signal, in each receiver, with the spreading code sequence of the corresponding transmitter to provide a detected signal for that receiver, sampling the detected signal to provide an estimated digital signal, and extracting from each detected signal a bit clock in dependence upon the timing of the detected signal;

processing signals output from the plurality of receivers to provide a plurality of power level signals each representing a power level for a respective one of the detected signals and a plurality of chip delay signals each representing a chip delay of a respective one of the detected signals relative to a reference one of the bit clocks, the correlation step in each of the plurality of receivers using parameters derived from said power level signals and said chip delay signals.

The invention is predicated upon the realisation that the MAI signals may be categorized as "locked" signals, whose individual signal-to-noise levels and chip delays, relative to a reference, namely the bit clock of a selected one of the receivers, are known, and "unlocked" signals, whose sum signal-to-noise ratio only is known. The invention exploits this "locked" signal MAI information to "tune out" high power MAI signals, thereby removing a substantial part of the MAI. In preferred embodiments, the "unlocked" signal-to-noise ratio information also is used.

The foregoing and other objects, features, aspects and advantages of the present invention will become more apparent from the following detailed description, taken in conjunction with the accompanying drawings, of a preferred embodiment of the invention, which is provided by way of example only.

DESCRIPTION OF THE PREFERRED EMBODIMENT

1. System

Figure 1:
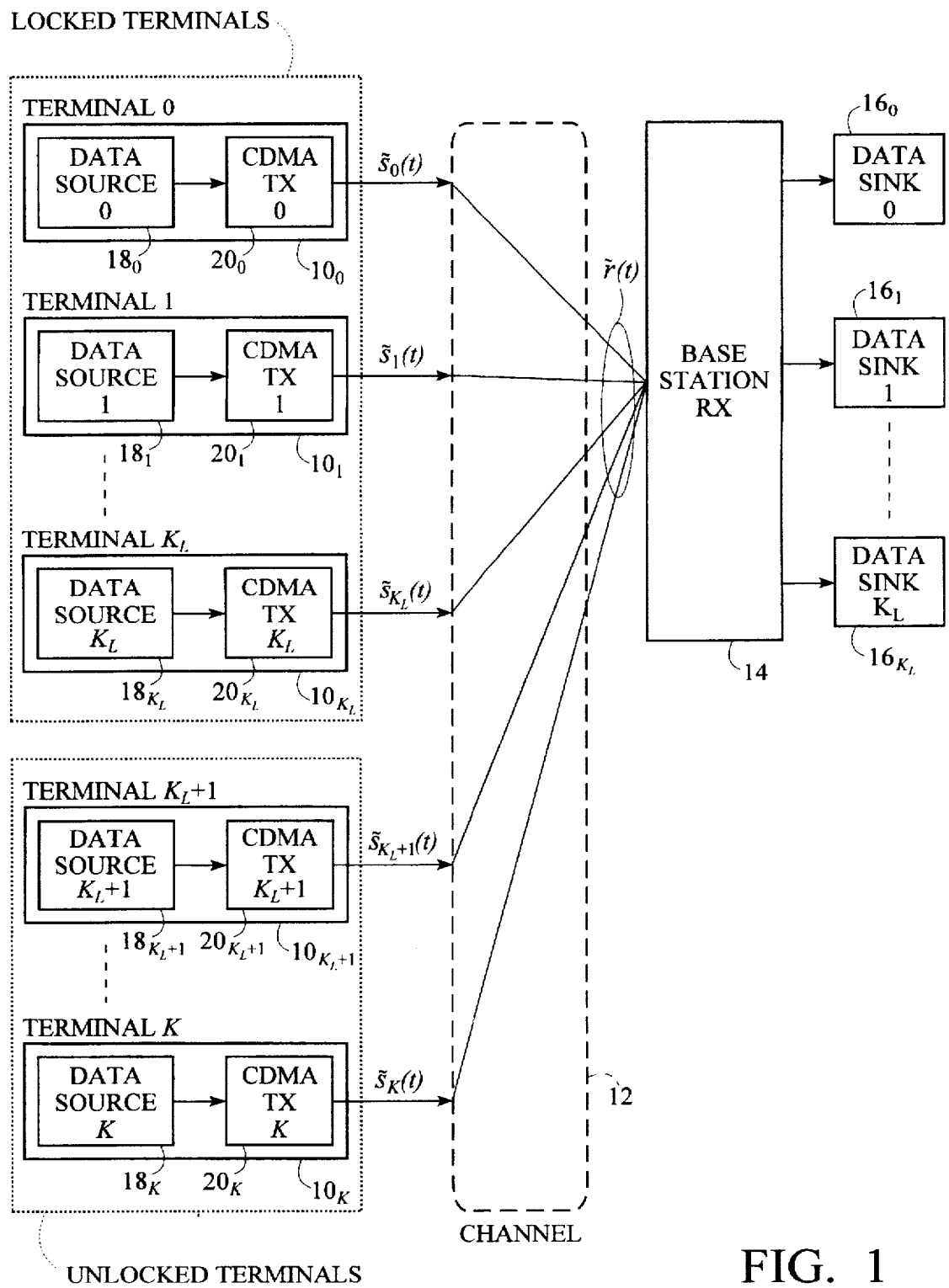
FIG. 1 is a simplified schematic block diagram of a direct-sequence code-division multiple access communications system comprising a plurality of user terminals communicating via a common channel with a common base or reception station.

Referring first to FIG. 1, a DS-CDMA system comprises K+1 terminals $10_0$–$10_K$ for transmitting digital signals asynchronously by way of a communication channel 12 to a common base or reception station receiver 14 which detects the individual signals and supplies them to corresponding data sinks $16_0$–$16_K$. The terminals $10_0$–$10_K$ comprise data supply means in the form of data sources $18_0$–$18_K$, respectively, coupled to CDMA transmitters $20_0$–$20_K$, respectively. Each data source generates a binary data stream comprising data bits {0,1} produced at a rate of $1/T_b$ and supplies the binary data stream to its associated transmitter which spreads and modulates the data bits on a radio frequency carrier signal for transmission over channel 12, which is common to all terminals. That is, each of the CDMA transmitters $20_0$–$20_K$ transmits over a common bandwidth in the frequency spectrum. In the channel 12, each of the transmitted signals encounters not only Additive White Gaussian Noise (AWGN) but also multi-access interference (MAI). For a particular terminal k, this MAI comprises the sum of the transmitted signals of the remaining terminals. Hence, the channel 12 can be characterized as a multiple-access channel.

The reception station 14 demodulates the signals received from a subset $K_L+1$ of the K+1 terminals ($K_L \leq K$) which are "locked". "Locked" terminals are those terminals for which bit synchronization of their data signals has already been accomplished. The remaining terminals form a subset of "unlocked" terminals for which bit timing information is unavailable. In a cellular CDMA communication system, for example, the locked subset might be the terminals in a particular cell, whereas the unlocked subset might be the terminals transmitting from neighbouring cells. Demodulation of the signals of the unlocked subset is unnecessary.

2. CDMA TRANSMITTER k

Figure 2:
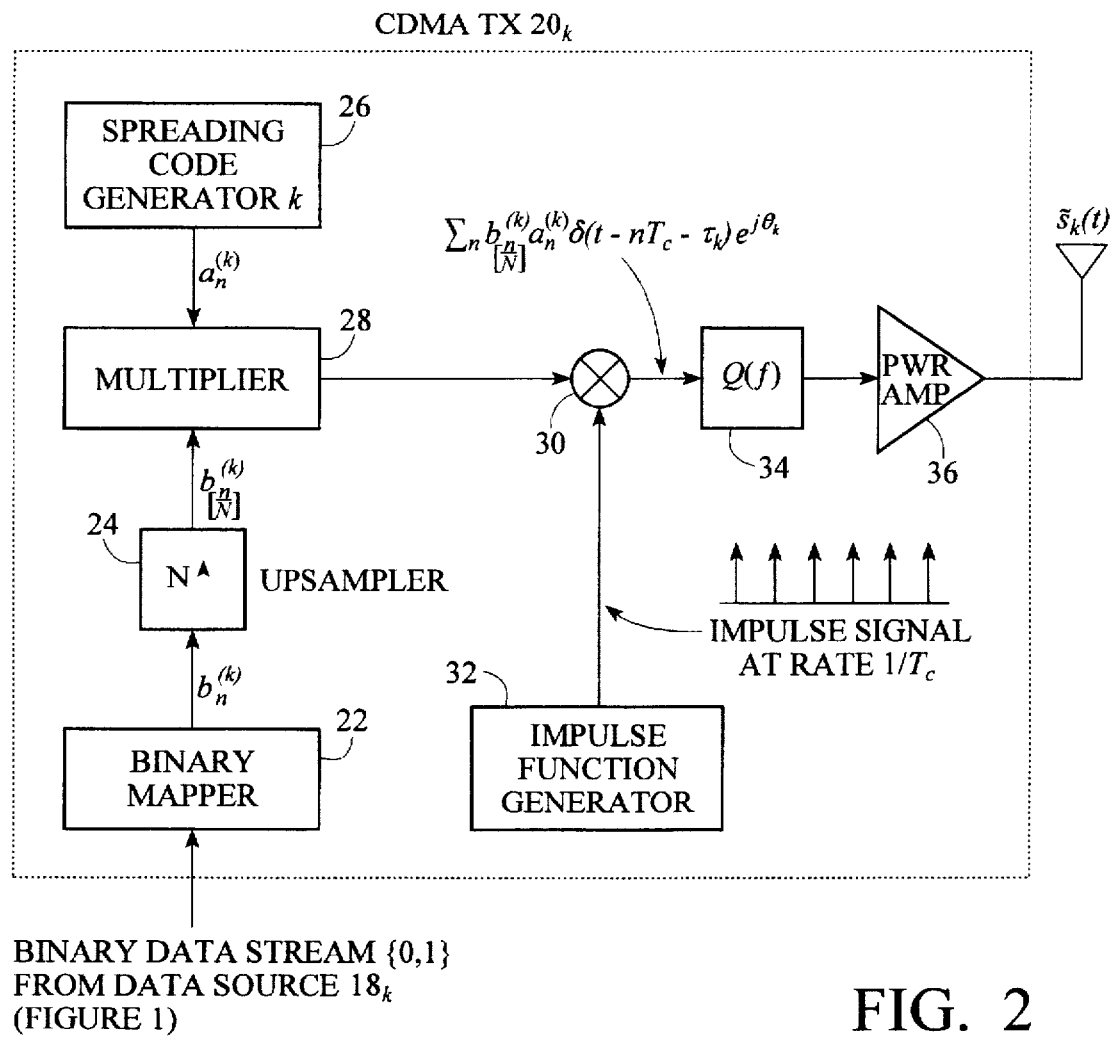
FIG. 2 is a simplified block schematic diagram of a transmitter portion of one of the user terminals.

The only difference between the transmitters $20_0$–$20_K$ is that each uses a unique spreading code to spread and modulate the data from its data source. For convenience, therefore, only one of the transmitters, designated as $20_k$, will be described in more detail. Referring to FIG. 2, the binary data stream from data source 18 is fed into binary mapper 22. The binary mapper 22 maps the input value 0 to the value 1 and the input value 1 to the value −1. The output $b_n^{(k)}$ of the binary mapper 22 is then oversampled by a factor of N by an upsampler 24 to produce oversampled mapped bits at a rate of $1/T_c$, equal to the chip rate. That is, for each bit that is input, the upsampler 24 outputs N samples all equal in value to the input bit. N represents the spreading gain (or processing gain) such that the chip rate is N times faster than the bit rate, i.e.

$$\frac{1}{T_c} = \frac{N}{T_b}.$$

A spreading code generator 26 generates a spreading sequence $\{a_n^{(k)}\}_{n=-\infty}^{\infty}$ which defines a short spreading code. For periodic sequences i.e. short spreading code, $a_{n+N}^{(k)}=a_n^{(k)}$, and the same spreading sequence spreads each bit. In this particular implementation, a periodic sequence is assumed. The elements of the spreading sequence are output at a rate of $1/T_c$. The elements can be complex with unit magnitude or can be $\{\pm 1\}$. The latter would be employed for a Direct-Sequence Binary Phase Shift Keying (DS-BPSK) transmitter. (An example of the timing of bits and chips for two adjacent terminals is given in FIGS. 3(a), (b), (d) and (e).)

The respective outputs of the upsampler 24 and the spreading code generator 26 are multiplied at a multiplier 28 to form chips. The multiplier 28 multiplies two discrete input signals and outputs their product as an analog signal. A second multiplier 30 then multiplies the output of the multiplier 28 by impulse (or delta) functions produced at the chip rate of $1/T_c$ by an impulse function generator 32.

The output of the second multiplier 30 is supplied to a chip filter 34 with the frequency response Q(f). In the time domain, the impulse response of the chip filter 34 is the chip waveform $\tilde{q}(t)$. An example of an output of the chip filter 34 is given in FIG. 3(c) and labelled "Signal of Terminal 0 Before Power Amp" for the rectangular chip waveform $$\tilde{q}(t) = \begin{cases} 1, & 0 \leq t < T_c \\ 0, & \text{otherwise} \end{cases}$$

Power amplifier 36 amplifies the output of the chip filter 34 and upconverts to a carrier frequency $f_c$ to produce the transmitted signal. The complex envelope of the transmitted signal is $$\tilde{s}_k(t) = \sqrt{2P_k} \sum_{n=-\infty}^{\infty} b^{(k)}_{\lfloor n/N \rfloor} a^{(k)}_n \tilde{q}_k(t - nT_c - \tau_k) e^{j\theta_k}$$

The left floor and right floor operations give the largest integer value less than or equal to the argument. The complex envelope of signals is denoted by ~. To use complex envelopes, the carrier frequency must be much larger than the bandwidth of the baseband signal.

The bit delay of $\tau_k$ and the phase offset of $\theta_k$ combine, respectively, the bit delays and phase offsets introduced by both the channel 12 and the CDMA transmitter $20_k$ of terminal $10_k$. These parameters are relative to the bit delay and phase offset, respectively, of the bit clock and phase of the signal of receiver $40_0$ corresponding to terminal $10_0$. Thus, $\tau_0=\theta_0=0.0 \leq \tau_k \leq T_b$, and $0<\theta_k<2\pi$. $P_k$ represents the power of the signal of terminal $10_k$ received at the reception station 14.

3. Reception Station Receiver

Figure 4:
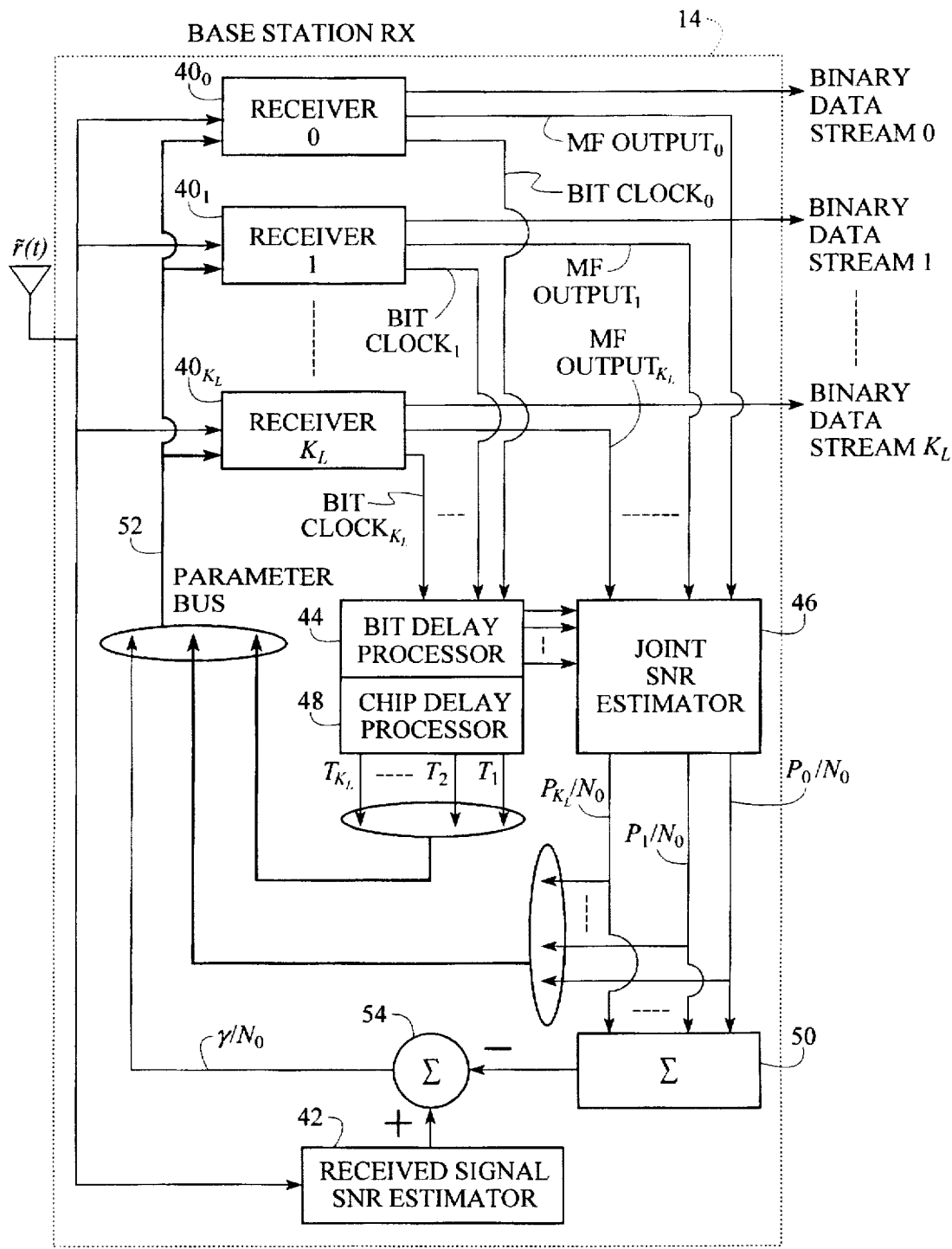
FIG. 4 is a block schematic diagram of the reception station including a plurality of receiver units.

Referring now to FIG. 4, the reception station 14 receives a complex baseband received signal $\tilde{r}(t)$ which comprises the signals $\tilde{s}(t)$ from all of the transmitters $20_0$–$20_K$ and AWGN. The received signal $\tilde{r}(t)$ is fed, in common, into $K_L+1$ separate receivers $40_0$–$40_{K_L}$ and a received signal SNR estimator 42. Each receiver produces three outputs: a binary data stream which is an estimate of the transmitted binary data stream, a matched filter (MF) output sample (detected signal) and a bit clock.

Figure 3:
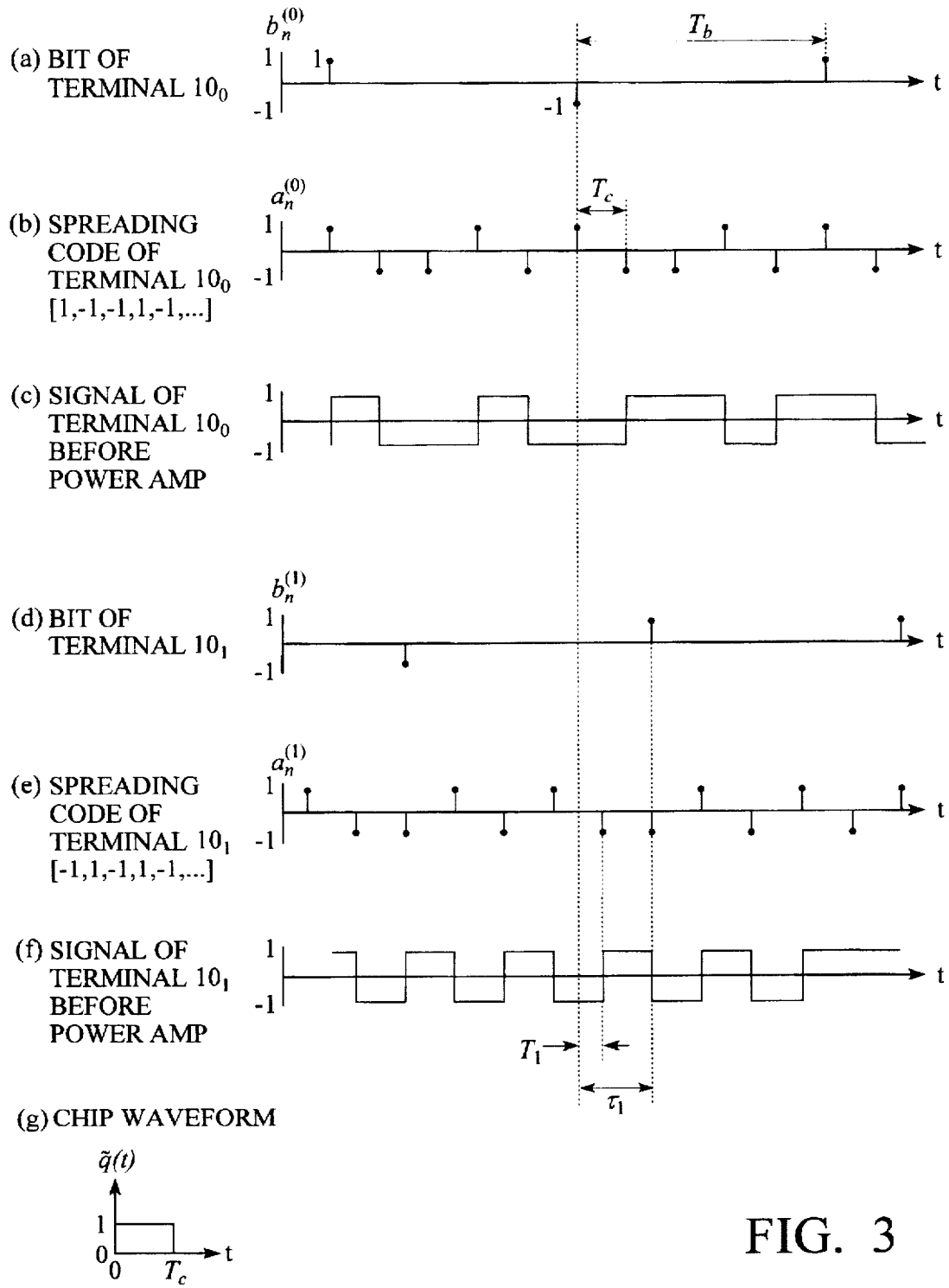
FIGS. 3(a) to 3(g) depict various signals in the transmitters of two of the terminals.

The bit clocks of all of the receivers $40_0$–$40_{K_L}$ are fed to a bit delay processor 44. The bit delay processor 44 measures the bit delay $\{\tau_k\}_{k=1}^{K_L}$ of each of the bit clocks of the $K_L$ receivers $40_1$–$40_{K_L}$ relative to the bit clock of receiver $40_0$. FIG. 3(f) illustrates bit delay $\tau_1$ for the signal of terminal $10_1$. Since $\tau_0=0$ 0 it is not necessary and can be dropped. Specifically, bit delay processor 44 measures the time elapsed from the rising edge of bit clock 0 to the next immediate rising edge of bit clock k. Bit delay processor 44 outputs the bit delays to joint SNR estimator 46 and, internally to chip delay processor 48.

The joint SNR estimator 46 receives the MF output samples from the receivers $40_0$–$40_{K_L}$ and the bit delays of each receiver from bit delay processor 44 and uses them to produce a digitized estimate, $P_k/N_0$, of the SNR for each of the signals from the "locked" terminals k. The outputs $P_0/N_0,P_1/N_0 \ldots P_{K_L}/N_0$ are passed to a summer 50 and also fed back to all of the receivers via a parameter bus 52. The noise $N_0$ is the thermal/AWGN noise level.

The summer 50 adds up all of the SNR estimates of the "locked" detected signals. A differencing device 54 subtracts the summed SNR of the locked signals from the net SNR of the received signal $\tilde{r}(t)$ obtained from received signal SNR estimator 42 to produce an estimate $\gamma/N_0$ of the SNR for each of the unlocked terminals, and supplies it to the receivers $40_0$–$40_{K_L}$ via the parameter bus 52.

The chip delay processor 48 measures the chip delay of the detected signal of each of the $K_L$ receivers relative to the bit clock of receiver $40_0$. The chip delay of receiver $40_k$ can be obtained by performing a Modulo $T_c$ operation upon bit delay $\tau_k$. The chip delay $T_1$ for terminal $10_1$ and receiver $40_1$ is shown in FIG. 3(f). The rising edge of the bit clock of receiver $40_1$ lags that of receiver $40_0$ by $1.5T_c$, the bit delay of receiver $40_1$ is $\tau_1=1.5T_c$, whereas the chip delay, $T_1=1.5T_c$ Modulo $T_c=0.5T_c$.

It should be noted that the chip delay satisfies $0 \leq T_k < T_c$ for $k \in [1,K_L]$ and that $T_0=0$. The chip delay processor 48 then supplies discretized and sampled values of the chip delays to the receivers $40_0$–$40_{K_L}$ via the parameter bus 52.

It should be appreciated that resolution in the chip delay values affects the range of permissible chip delay values. The computations and memory required in the impulse response processor which computes the coefficients (to be described later with reference to FIG. 6) are directly proportional to the degree of resolution of the chip delays; and independent of the total number of users. The chip delay value $T_k$ associated with receiver $40_k$ can take on one of $N_R$ possible discrete values in the set $$T_i \in \left\{ 0, \frac{T_c}{N_R}, \frac{2T_c}{N_R}, \ldots, \frac{(N_R-1)T_c}{N_R} \right\}.$$

Figure 5:
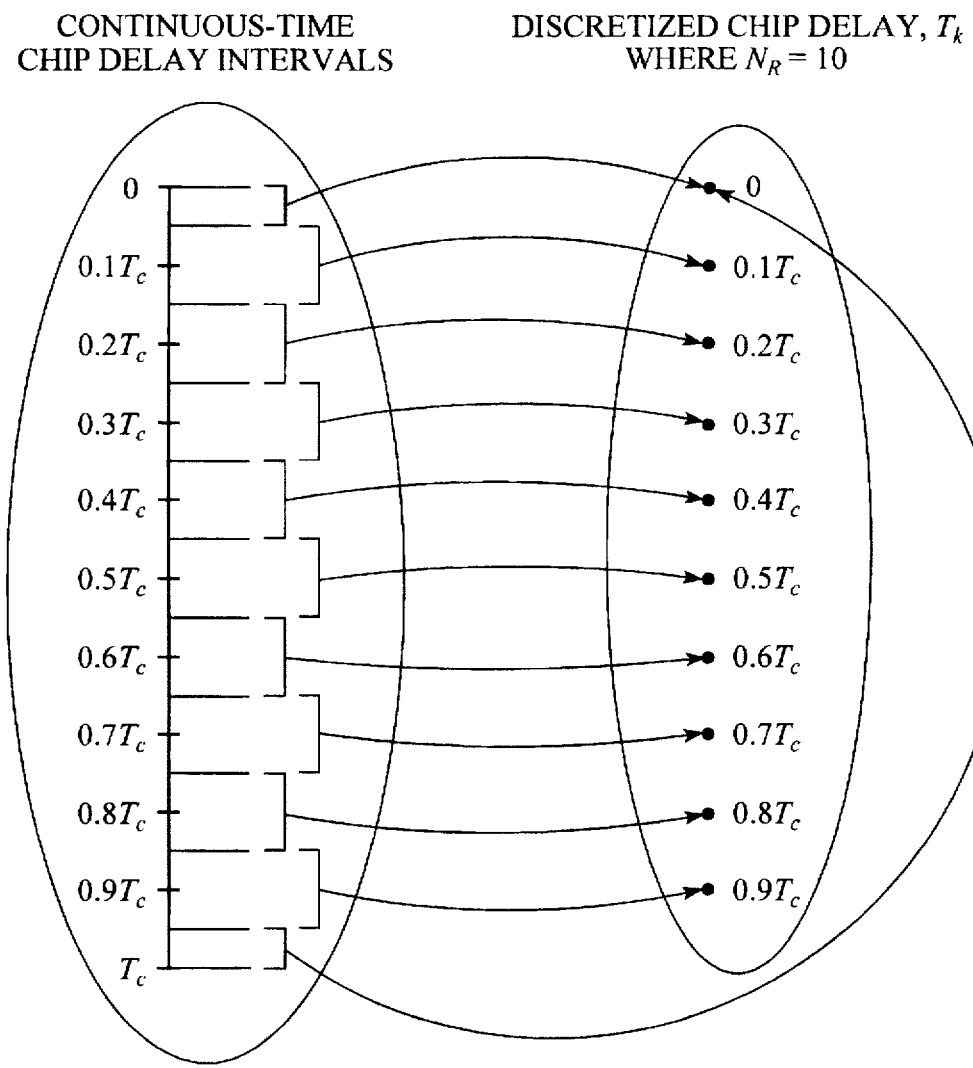
FIG. 5 represents chip delay discretization.

For example, for $N_R=10$, the range of chip delay values becomes $T_k \in \{0, 0.1T_c, 0.2T_c, \ldots, 0.9T_c\}$. The discretization rule, mapping between continuous-time chip delay and discretized chip delay $T_k$ for 10 intervals per chip, is illustrated in FIG. 5.

The resolution, performance, computational complexity and memory space requirements of the receiver are directly proportional to $N_R$.

4. Receiver $40_k$

The only difference between the receivers $40_0$–$40_{K_L}$ is that each uses a different one of the spreading code sequence of the CDMA transmitters $20_0$–$20_{K_L}$ to decode its signal. Consequently, only one receiver, designated $40_k$, will be described in more detail with reference to FIG. 6. The inputs to receiver $40_k$ in FIG. 6 comprise: (i) the complex envelope of the received signal $\tilde{r}(t)$ from channel 12; and, (ii) via the parameter bus 52, the estimate $\gamma/N_0$ of the SNR of the signals from unlocked terminals, and SNR estimates of locked terminals $$\left\{ \frac{P_l}{N_0} \right\}_{l=0}^{K_L}$$

where $l \neq k$, and the chip delay estimates of locked terminals $\{T_l\}_{l=1}^{K_L}$. The chip delay $T_0$ of receiver $40_0$, like its bit delay $\tau_0$, is equal to zero and is not needed.

At the input of the receiver $40_k$, the received signal $\tilde{r}(t)$ is fed into multiplier 60 which multiplies the received signal by the phase signal $e^{-j\theta_k}$ from phase acquisition and tracking unit 62. The product is fed to a matched filter unit 64 and into the phase tracker 62 which produces the phase signal $e^{-j\theta_k}$, forming a feedback loop. The phase tracker 62 follows the phase $e^{j\theta_k}$ of the signal transmitted from signal terminal k.

The matched filter unit 64 comprises a first matched filter 66 and a second, adjustable matched filter 68 having their outputs connected to a differencing device 65. The received signal is fed into both of the matched filters 66 and 68. Differencing device 65 subtracts the output of matched filter 68 from the output of matched filter 66 to produce the output (MF) of matched filter unit 64 and supplies it to a bit synchronization unit 72, the phase tracker 62 and a sampler 74. The bit synchronization unit 72 produces and outputs a bit clock that is synchronized to the data bit stream of terminal $10_k$ in the received signal. The bit clock is fed back to matched filter 68 and the sampler 74. The bit clock BIT CLOCK$_k$ is also an output for the receiver $40_k$. The sampler 74 uses the rising edge to sample the output of matched filter unit 64. The sampler 74 output is then fed into a real value extractor 76 which extracts the real part of the complex valued sample. If real chips and real chip waveform are used, all the signals will be real and the Re(·) operation will not be necessary. The output of the operator 76 is supplied to the joint SNR estimator 46 (FIG. 4) as an output MF OUTPUT SAMPLE of receiver $40_k$, and is also input to a hard decision device (slicer) 78 which produces a bit estimate $\hat{b}_n^{(k)}$. The slicer output is fed into an inverse bit mapper 80 which maps the input value −1 to 1 and the input value 1 to 0. The output of the inverse bit mapper 80 is an estimate of the binary data stream of terminal $10_k$.

The other signals received by receiver $40_k$, namely the chip delays, $\{T'_l\}_{l=1}^{K_L}$ and SNR estimates $$\left\{ \frac{P_l}{N_0} \right\}_{l=0}^{K_L}$$

where $l \neq k$, are supplied to a sorter of SNR parameters 82. Since the range of chip delays $\{T'_i\}_{i=0}^{N_R}$ is finite, fixed and known in advance, the task of the sorter 82 is to map the values $\{T_l\}_{l=1}^{K_L}$ and $$\left\{ \frac{P_l}{N_0} \right\}_{l=0}^{K_L}$$

to a new SNR array for receiver $40_k$:

array$^{(k)}$=[$B_1^{(k)}, B_2^{(k)}, \ldots, B_{N_R}^{(k)}$] with $N_R$ elements. The index of an element in the array indicates its chip delay value relative to the chip delay of receiver $40_k$. The value of the element represents the sum of SNR estimate whose common chip delays match the chip delay for that index. Specifically, $B_i^{(k)}$ is the sum of SNR estimates $P_l/N_0$ for which their corresponding chip delay satisfies $T'_l=(T_l-T_k)$ Modulo $T_c$ over $l \in [1, \ldots, k-1, k+1, \ldots, K_L]$ where $$T_i = (i-1)\frac{T_c}{N_R} \text{ for } i \in [1, N_R]$$

For example, given four "locked" signals $K_L=3$, number of chip delay intervals $N_R=10$, chip delay $T_0=0T_c$, chip delay $T_1=0.2T_c$, chip delay $T_2=0.2T_c$, $$T_3 = 0.7T_c, \frac{P_0}{N_o}, \frac{P_1}{N_o}, \frac{P_2}{N_o} \text{ and } \frac{P_3}{N_o},$$

then the output of sorter 82 of receiver $40_0$ would be $$\text{array}^{(0)} = \left[ 0, 0, \frac{P_1}{N_o} + \frac{P_2}{N_o}, 0, 0, 0, 0, \frac{P_3}{N_o}, 0, 0, \right]$$

the outputs of sorters 82 of receivers $40_1$ and $40_2$ would be $$\text{array}^{(1)} = \left[ \frac{P_2}{N_o}, 0, 0, 0, 0, \frac{P_3}{N_o}, 0, 0, \frac{P_0}{N_o}, 0 \right]$$

$$\text{array}^{(2)} = \left[ \frac{P_1}{N_o}, 0, 0, 0, 0, \frac{P_3}{N_o}, 0, 0, \frac{P_0}{N_o}, 0 \right]$$

the output of sorter 82 of receiver $40_3$ would be $$\text{array}^{(3)} = \left[ 0, 0, 0, \frac{P_0}{N_o}, 0, \frac{P_1}{N_o} + \frac{P_2}{N_o}, 0, 0, 0, 0 \right]$$

The sorter of SNR parameters 82 outputs the $N_R$ elements of the SNR array$^{(k)}$ to impulse response processor 84. The signal $\gamma/N_0$, representing the SNR of the signals from unlocked terminals, is also fed to the impulse response processor 84.

The impulse response processor 84 calculates a set of coefficients and supplies them to second matched filter 68. The coefficients are the sampled discrete-time version of a continuous-time impulse response. Matched filter 68 loads the coefficients to form its impulse response.

5. First Matched Filter 66

Figure 7:
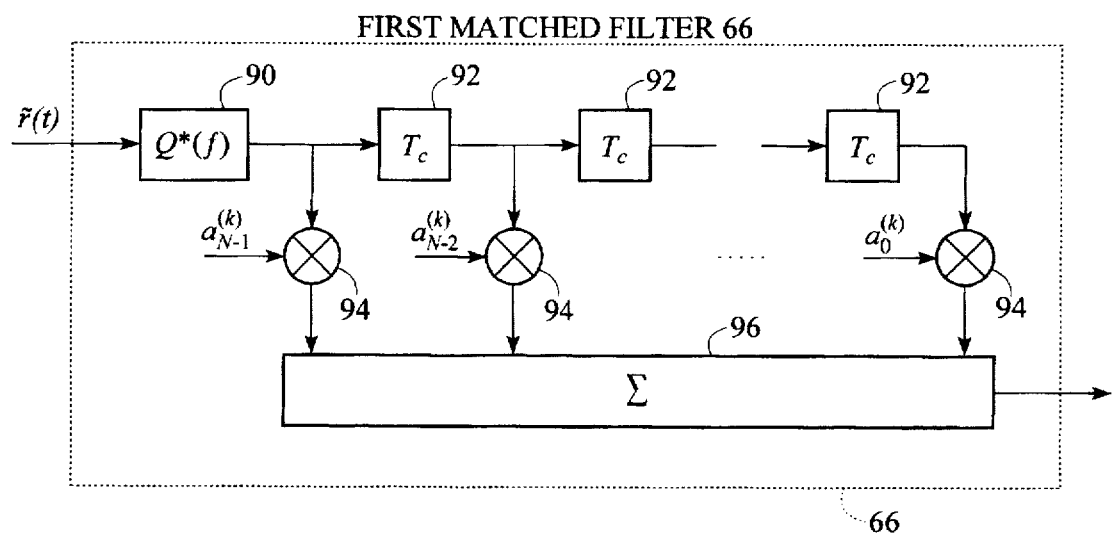
FIG. 7 is a block schematic diagram of a first matched filter of the receiver.

First matched filter 66 may be one of several well-known conventional matched filters used presently in most direct-sequence spread spectrum receivers. An example is illustrated in FIG. 7. The received signal $\tilde{r}(t)$ is first passed through a chip waveform filter 90 with an impulse response of $\tilde{q}*(T_c-t)$ which is matched to the transmitted chip waveform $\tilde{q}(t)$ (see FIG. 3(g)). Given a complex number z, the term z* represents the complex conjugate of z. Because the chip waveform is symmetrical and satisfies $\tilde{q}(T_c-t)=\tilde{q}(t)$, the frequency response of this filter is $Q*(f)$.

The output of the chip waveform matched filter 90 is supplied to a tapped-delay filter with N-1 delay elements 92 each with a delay duration of $T_c$. Multipliers 94 multiply the tap signals by the respective coefficients and their outputs are summed by summing device 96, the output of which is the output of the first matched filter 66. The tap coefficients are in fact the elements of the same spreading code employed in the corresponding CDMA transmitter $20_k$ (not shown specifically) in the reverse order.

6. Second Matched Filter 68

Figure 8:
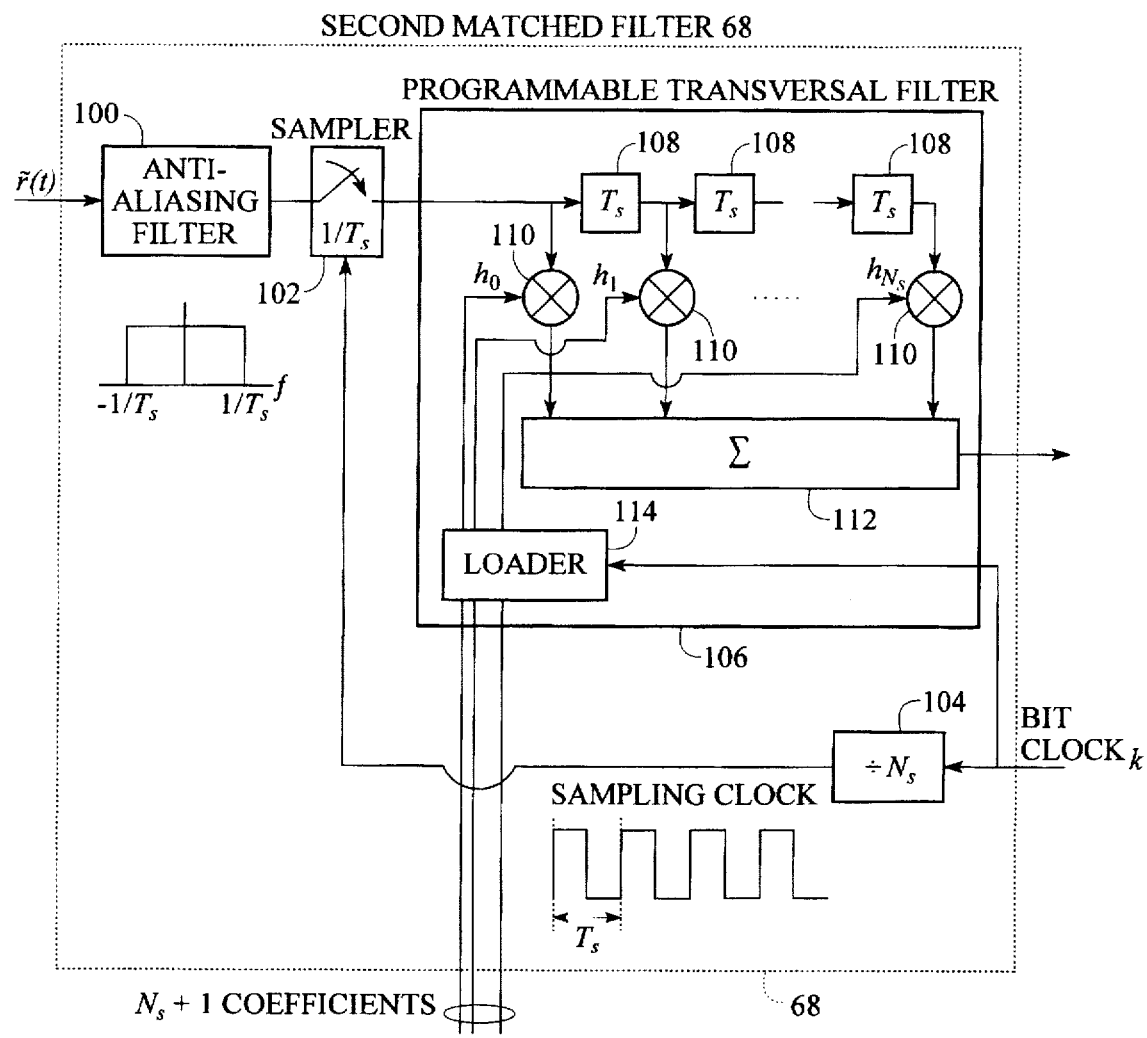
FIG. 8 is a block schematic diagram of a second, adaptive matched filter of the receiver.

Second matched filter 68 is depicted in more detail in FIG. 8. In the second matched filter 68, the received signal $\tilde{r}(t)$ is first fed into an anti-aliasing filter 100 which bandlimits the received signal to the frequency $|f| \leq 1/T_s$. Based on Nyquist's sampling theorem, this sampling rate $1/T_s$ is set to a value greater than twice the bandwidth BW of the transmitted signals $s_k(t)$. The sampling rate can also be constrained to be set to some integer multiple, $\alpha$, of the chip rate $1/T_c$.

The output of anti-aliasing filter 100 is fed to a second sampler 102. The sampler 102 samples its input at the rate of $1/T_s$. Its sampling instants occur on the rising edge of its sampling clock. The sampling clock is derived from the BIT CLOCK k, which is input to a divider 104 of the second matched filter 68. The divider 104 divides the bit duration $T_b$ of bit clock BIT CLOCK k by an integer factor of $N_s$ where $N_s=\alpha N$ to provide the sampling clock.

The output of the sampler 102 is fed into a programmable transversal filter 106 with $N_s=\alpha N$ delay elements 108 each with a delay duration of $T_s$, multipliers 110 for multiplying the tap signals by respective coefficients, and a summing device 112 for summing the outputs of the multipliers 110. Functionally, the programmable transversal filter 106 is identical to the tapped delay line filter of first matched filter 66 except in one major respect: its tap coefficients $h_0$ to $h_{N_s}$ can be changed. The $N_s+1$ coefficients are stored in a loader 114 located inside the programmable transversal filter 106. The loader 114 uses the rising edge of the BIT CLOCK k to synchronize the loading of the coefficients at its input. The loader 114 loads the coefficients from its input when there is a new set of coefficients to load. The output of the summing device 112 is the output of programmable transversal filter 106 and also the output of second matched filter 68.

If, for example, the number N of chips per data bit is 50 and the rate $\alpha$ of sampling rate to chip is 4, then the number of delay elements 108 is $N_s=200$.

7. Impulse Response Processor 84

Figure 9:
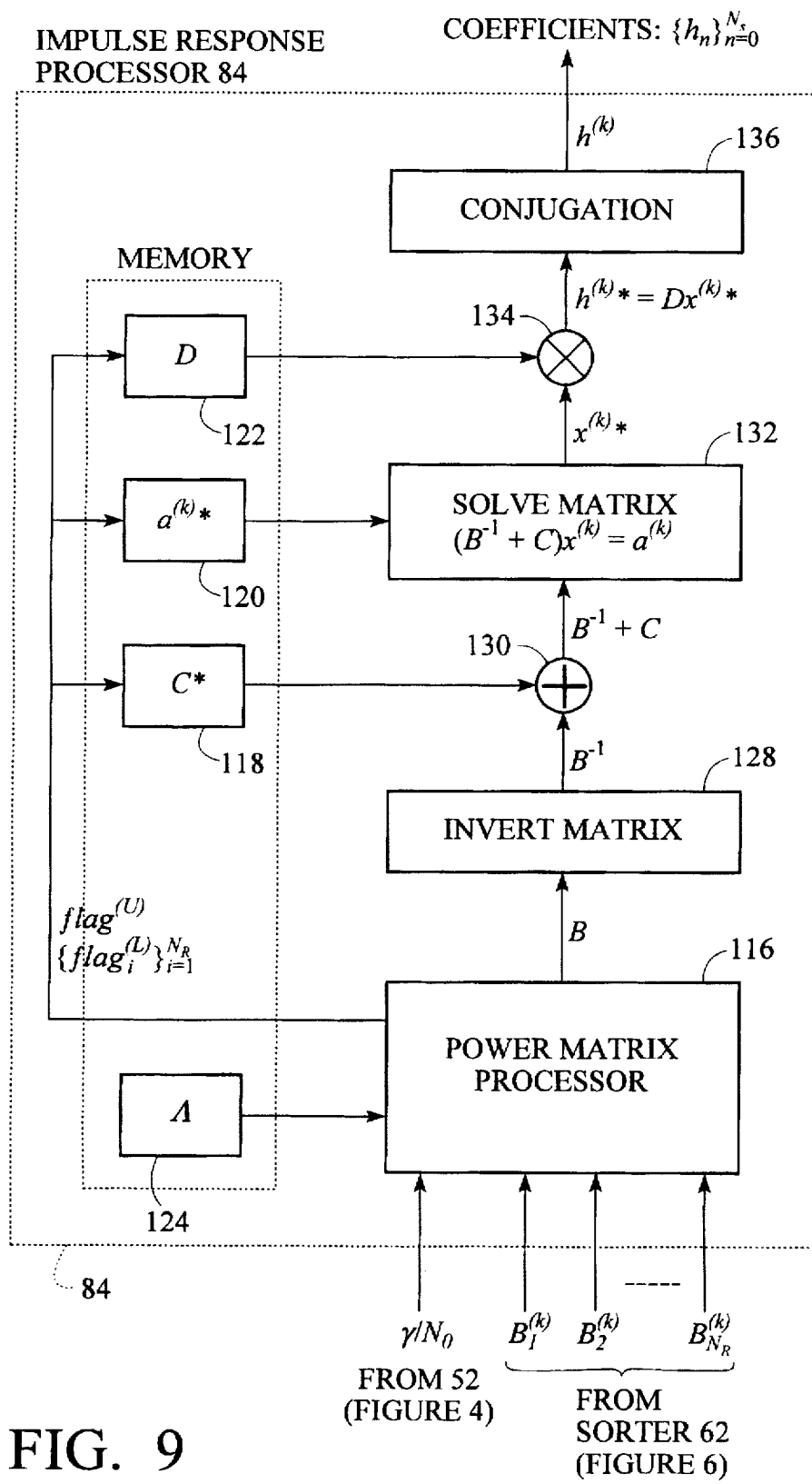
FIG. 9 represents operation of an impulse response processor of the receiver.

The operations of the impulse response processor 84 (FIG. 6) are depicted in FIG. 9. The parameters $\text{array}^{(k)}=[B_1^{(k)},B_2^{(k)},\ldots,B_{N_R}^{(k)}]$ from the sorter 82 (FIG. 6) and the unlocked SNR parameter $\gamma/N_0$ from subtracter 54 (FIG. 4) are fed into a power matrix processor 116. It is possible that some of the locked and unlocked SNR parameters may be zero. In this case, to avoid singular matrices and reduce computational complexity, cross-sections of the matrices (to be defined later) will be removed. To facilitate the removal process, the power matrix processor 116 generates a set of flags:

$$\text{flag}_i^{(L)} = \begin{cases} 1, & B_i^{(k)} = 0 \\ 0, & \text{otherwise} \end{cases} \tag{3}$$

for $i \in [1,N_R]$ and $$\text{flag}^{(U)} = \begin{cases} 1, & \gamma/N_0 = 0 \\ 0, & \text{otherwise} \end{cases} \tag{4}$$

The incorporation of these flags provides the receiver $40_k$ with some added flexibility. For example, when no unlocked terminals are present, $\text{flag}^{(U)}$ can be set to zero to provide a second matched filter 68 which suppresses the MAI of locked terminals only. On the other hand, when only unlocked terminals and no locked terminals other than the desired terminal k are present, all the $\{\text{flag}_i^{(L)}\}_{i=1}^{N_R}$ can be set to zero to generate a second matched filter 68 which suppresses the MAI of unlocked terminals in a manner similar to that of a "noise-whitening" matched filter, such as that disclosed by Davis. The power matrix processor 116 outputs all of the $N_R+1$ flags to the matrix generators 118, 120 and 122 which generate matrices $C*$, $a^{(k)}*$ and D, respectively.

The second function of the power matrix processor 116 is to produce and output a diagonal matrix $$B = \begin{bmatrix} B^{(L)} & 0 \\ 0 & \frac{\gamma}{N_o} \Lambda \end{bmatrix} \tag{5}$$

where the sub-matrix $$B^{(L)} = \begin{bmatrix} B_1^{(k)} I_{N_L} & \cdots & 0 \\ 0 & \cdot & 0 \\ 0 & \cdots & B_{N_R}^{(k)} I_{N_L} \end{bmatrix} \tag{6}$$

$I_m$ is an m by m identity matrix, and $$\Lambda = \begin{bmatrix} \lambda'_1 & \cdots & 0 \\ \vdots & & \vdots \\ 0 & \cdots & \lambda'_{N_M} \end{bmatrix} \tag{7}$$

The value of $N_L=N+M'+1$ where $M'T_c$ is the time duration of a chip waveform. Here, the chip waveform duration is constrained to be some odd multiple of $T_c$ such that $M' \in \{1, 3, 5, \ldots\}$.

For example, the rectangular chip waveform $$\tilde{q}(t) = \begin{cases} 1, & 0 \leq t < T_c \\ 0, & \text{otherwise} \end{cases} \tag{8}$$

has a duration of one chip such that $M'=1$.

The matrix $\Lambda$ is stored in memory 124 and is fixed. The elements of the matrix, $\{\lambda'_q\}_1^{N_v}$ are calculated in advance and can be obtained by solving for the eigenvalues $\lambda'_q$ and eigenfunctions $\phi_q(t)$ of the integral equation:

$$\lambda'\phi(t) = \int_0^{T_b} R_q^{(U)}(t-u)\phi(u)du \tag{9}$$

where $$R_q^{(U)}(\tau) = \frac{1}{T_c} \int_{-\infty}^{\infty} \tilde{q}(y+\tau)\tilde{q}^*(y)dy \quad (10)$$

For a discussion of the solution of this integral equation and the selection of the design parameter $N_U$ the reader is directed to an article by the inventors, Y. C. Yoon and H. Leib, entitled "Matched Filter with Interference Suppression Capabilities for DS-CDMA," (not yet published) which is appended hereto and incorporated herein.

If flag$^{(U)}$=0 then O,O and $$\frac{\gamma}{N_o} \Lambda$$

are removed from matrix B such the B=B$^{(L)}$. For each i∈[1,$N_R$}, if flag$_i^{(L)}$=0 then B$_i^{(k)}$ is removed from B where k ∈[1,$N_R$]. The dimension of the matrix B becomes N'$_R$N$_L$+N'$_U$ by N'$_R$N$_L$+N'$_U$ where N'$_R$=$\Sigma_{i=1}^{N_R}$flag$_i^{(L)}$ and N'$_U$=flag$^{(U)}$N$_U$. It should be noted that, when all the flags are one, B takes on its maximum size of $N_R N_L + N_U$ by $N_R N_L + N_U$.

The real matrix B is then inverted by invert matrix function 128. Since the matrix is diagonal, the inversion operation requires only the inversion of the individual diagonal elements. Next, the inverted matrix B$^{-1}$ is added to the matrix C. The matrix C is stored in memory within matrix generator 118 and is fixed. It is defined as $$C = \left[\begin{array}{c|c} C^{(L)} & K^* \\ \hline K & I_{N_U} \end{array}\right] \quad (11)$$

$$C^{(L)} = \begin{bmatrix} C_{1,1} & \cdots & C_{1,N_R} \\ \vdots & & \vdots \\ C_{N_R,1} & \cdots & C_{N_R,N_R} \end{bmatrix} \quad (12)$$

$$C_{i,k} = \begin{bmatrix} C_{i,k;1,1} & \cdots & C_{i,k;1,N_L} \\ \vdots & & \vdots \\ C_{i,k;N_L,1} & \cdots & C_{i,k;N_L,N_L} \end{bmatrix} \quad (13)$$

$$c_{i,k;j,m} = \int_0^{T_b} c_{i,j}^*(t)c_{k,m}(t)dt \quad (14)$$

$$c_{k,m}(t) = \tilde{q}\left(t - T_k - \left(m - \frac{M'+1}{2}\right)T_c\right) \quad (15)$$

and $$K = [K_1, \ldots, K_{N_R}] \quad (16)$$

$$K_i = \begin{bmatrix} K_{i;1,1} & \cdots & K_{i;1,N_L} \\ \vdots & & \vdots \\ K_{i;N_U,1} & \cdots & K_{i;N_U,N_L} \end{bmatrix} \quad (17)$$

$$K_{i;q,j} = \int_0^{T_b} c_{i,j}(t)\phi_q^*(t)dt \quad (18)$$

i,k ∈[1,$N_R$],j,m, ∈[1, $N_L$], and q ∈[1,$N_U$]

If flag$^{(U)}$=0 then K, K* and $I_{N_U}$ is removed from C such that C=C$^{(L)}$. For each i ∈[1,$N_R$], if flag$_i^{(L)}$=0 then $C_{i,k}$ and $C_{k,i}$ are removed from C$^{(L)}$ where k ∈[1,$N_R$] and K$_i$ is removed from K.

For example, if flag$_{1,hu\ (L)}$=0 then the top row of submatrices in C$^{(L)}$:$C_{1,1}, \ldots, C_{1,N_R}$ and the leftmost column of submatrices $C_{1,1} \ldots C_{N_R,1}$ are removed; K$_1$ is removed from K.

The outputs from matrix generator 118 and matrix inverter 128 are summed by summer 130 to give the (N'$_R$N$_L$+N'$_U$) by (N'$_R$N$_L$+N'$_U$) matrix (B$^{-1}$+C) which, with the column vector $\alpha^{(k)*}$ from second matrix generator 120 is input into solve matrix block 132. The vector $\alpha^{(k)*}$ is stored in memory in matrix generator 120 and is fixed. Its conjugate is defined as $$\alpha = [\alpha^{(L)} | \alpha^{(U)}] \quad (19)$$

$$\alpha^{(L)} = [\alpha_1^{(L)} \ldots \alpha_{N_R}^{(L)}] \quad (20)$$

$$\alpha_i^{(L)} = [\alpha_{i,1}^{(L)}, \ldots, \alpha_{i,N_L}^{(L)}] \quad (21)$$

$$\alpha_{i,j}^{(L)} = \int_0^T {}^bc_{i,j}(t)\alpha_o^*(t)dt \quad (22)$$

$$\alpha^{(U)} = [\alpha_1^{(U)}, \ldots, \alpha_{N_U}^{(U)}] \quad (23)$$

$$\alpha_i^{(U)} = \int_0^{T_b} \alpha_o^*(t)\phi_i(t)dt \quad (24)$$

$$\tilde{\alpha}_o(t) = \sum_{n=0}^{N-1} d_N^{(0)}\tilde{q}(t - nT_c) \quad (25)$$

If flag$^{(U)}$=0 then $\alpha^{(U)}$ is removed from $\alpha$ such that $\alpha$=$\alpha^{(L)}$. For each i ∈[1, $N_R$], if flag$_i^{(L)}$=0 then $\alpha_i^{(L)}$ is removed from $\alpha^{(L)}$.

The solve matrix block 132 solves a system of N'$_R$N$_L$+N'$_U$ linear equations with N'$_R$N$_L$+N'$_U$ unknowns represented by the column vector x$^{(k)*}$:

$$(B^{-1}+C)\ x^{(k)*} = \alpha^{(k)*} \quad (26)$$

For example, when $N_R$=10, $N_L$=50 and $N_U$=100, the dimension of the matrix is, at most, 600 by 600 when all of the flags are equal to 1.

The computational complexity involved in solving the matrix equation can be reduced by noting that the matrix B$^{-1}$+C is Hermetian symmetric.

The solve matrix block 132 outputs the solution vector x$^{(k)*}$ to multiplier 134 which multiplies the vector x$^{(k)*}$ with the matrix D from third matrix generator 122 where it is stored in memory and fixed.

The (N$_s$+1) by (N'$_R$N$_L$+N'$_U$) matrix D is defined as $$D = \begin{bmatrix} D_0 \\ D_1 \\ \vdots \\ D_{N_S} \end{bmatrix} \quad (27)$$

$$D_n = [c_n, \phi_n] \quad (28)$$

$$c_n = [c_1(n), c_2(n), \ldots c_{N_R}(n)] \quad (29)$$

$$c_k(n) = [c_{k,1}(nT_s), c_{k,2}(nT_s), \ldots C_{k,N_L}(nT_s)] \quad (30)$$

$$\phi_n = [\phi_1(nT_s), \phi_2(nT_s), \ldots \phi_{N_U}(nT_s)] \quad (31)$$

If flag$^{(U)}$=0 then $\phi_n$ is removed from D$_n$ so that D$_n$=c$_n$ for all n ∈[1,$N_s$+1]. For each i ∈[1,$N_R$], if flag$_i^{(L)}$=0 then c$_i$(n) is removed from c$_n$.

The output of multiplier 134 is supplied to conjugator 136 where the product of the matrix multiplication operation is conjugated to produce the coefficient vector h* whose unconjugated version is defined as $$h = [h_0, h_1, \ldots, h_{N_s}] \quad (32)$$

Figure 6:
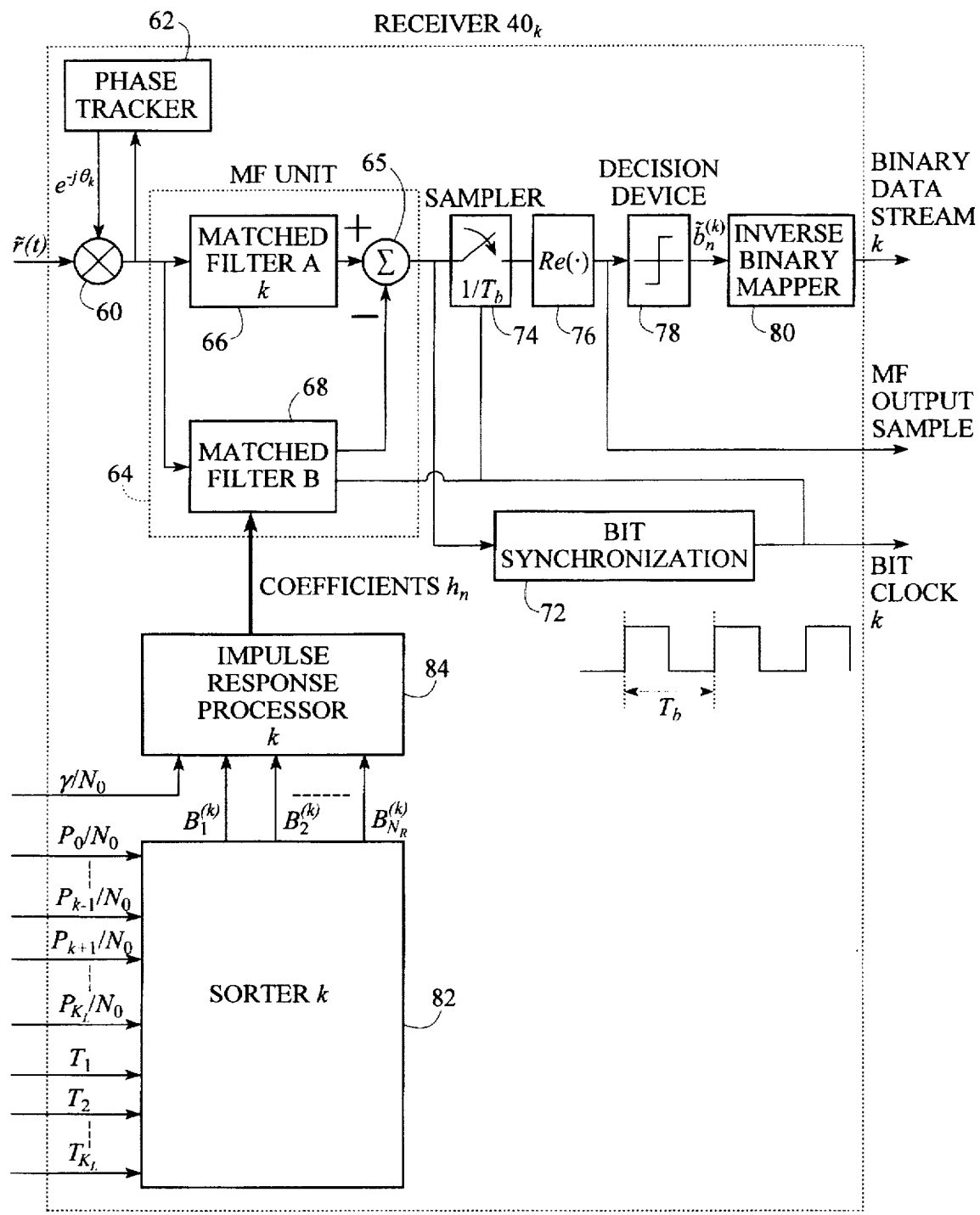
FIG. 6 is a simplified block schematic diagram of one of the receiver units.

The vector h* is the output of the Impulse Response Processor 84 which is fed to second matched filter 68 (FIG. 6). The elements of the vector determine the coefficients of second Matched Filter 68. These coefficients are in fact the sampled (discrete-time) version of the continuous-time impulse response for second Matched Filter 68.

It is envisaged that, although the above-described embodiment has a first matched filter with coefficients corresponding to the spreading sequence, and a second matched filter with adjustable coefficients to "tune out" the MAI, a single matched filter could be used instead, in which case the spreading sequence would be stored in the impulse response processor and taken into account in calculating the coefficients for the single matched filter.

An advantage of receivers embodying the present invention is that they may be used in CDMA systems which employ channel coding and/or long spreading sequences which span a large number of bits, since the receivers of the present invention are not constrained to employing the same spreading sequence segment to modulate each data bit. In order to employ the receiver with different spreading code segments, the first matched filter 66 (FIGS. 4 and 7) and impulse response processor 84 (FIGS. 6 and 9) would need to be modified. In matched filter 66, the sequences $\{\alpha_n^{(k)}\}_{n=0}^{N-1}$ would have to be reloaded with a new code segment corresponding to each new bit interval. The segments will eventually repeat themselves.

The impulse response processor 84 would be affected in two ways. As described above, the pre-calculated and pre-stored matrices: D, C, $\Delta$ and vector $\alpha^{(k)*}$ are all fixed (i.e. permanent). When the same spreading sequence is not used to decode each bit, $a^{(k)*}$ will change for each new subsequence for the reception of each new bit. It should be noted, however, that after a certain number of bits, the spreading sequence will repeat itself and $\alpha^{(k)*}$ will repeat itself as well. Hence, a set of "sub-sequence" vectors $\alpha_n^{(k)*}$ indexed by n for the detection of bit $b_n^{(k)}$ is required. This set can be stored permanently in memory as well.

The second effect is that the coefficients $\{h_n\}_{n=0}^{N_s}$ for matched filter 68 would need to be calculated every $T_b$ seconds. When the spreading sequence is the same, the coefficients are calculated whenever there is a change in the B matrix.

Finally, it should be emphasized that the matrices: D, C, $\Delta$ would remain fixed and constant. Moreover, they are identical for all the impulse response processors.

It is also envisaged that matched filter 66 might be replaced by a correlator with integrate-and-dump, especially if different spreading code segments are used.

It is envisaged that the sum power of the "unlocked" signals could be dispensed with and only the signal-to-noise ratios of "locked" signals used to determine the coefficients of the matched filter unit.

Although the spreading code $\alpha_n^{(k)}$ in this specific embodiment has values ±1, , it would be possible to use complex numbers with unit magnitude, for example with elements ±1, ±j as in direct-sequence quaternary phase shift key systems.

Although the components of the receiver have been depicted as discrete system blocks, it should be appreciated that most, if not all, of the receiver would likely be implemented using a digital signal processor or microprocessor.

An advantage of embodiments of the present invention, particularly as compared with the "optimum" and "sub-optimum" systems, is that, when channel conditions change, i.e. as users connect and disconnect, the receiver recalculates the impulse response of the matched filter unit. Specifically, it does the calculation as the chip delay and signal power parameter information changes. A further advantage is that the complexity is substantially independent of the number of users. The use of relatively long spreading codes permits a greater number of unique spreading code segments to be used and hence allows a greater number of users to use the system simultaneously with enhanced privacy.

Although an embodiment of the invention has been described and illustrated in detail, it is to be clearly understood that the same is by way of illustration and example only and is not to be taken by way of the limitation, the spirit and scope of the present invention being limited only by the appended claims.

What is claimed is:

1. Reception station apparatus for a code division multiple access (CDMA) communications system comprising a plurality of CDMA transmitters and at least one such reception station apparatus coupled together by a communications channel, each transmitter for encoding a respective one of a corresponding plurality of digital signals with a spreading code unique to that transmitter, each bit of the digital signal being encoded by a spreading code sequence comprising a multiplicity of elements to provide a corresponding multiplicity of chips, all of the transmitters arranged to transmit their respective, encoded signals to the reception station apparatus asynchronously via the communications channel so as to occupy the same bandwidth, the reception station apparatus comprising
a plurality of receivers corresponding to at least a subset of the transmitters, the receivers being connected to receive, in common, a received signal comprising all of the encoded signals from the plurality of transmitters,
each receiver comprising a correlation unit for correlating the received signal with the spreading code sequence of the corresponding one of the transmitters to provide a detected signal, a sampling unit for sampling the detected signal to provide an estimated digital signal, and a synchronisation unit for providing a bit clock in dependence upon the timing of the detected signal,
the reception station apparatus further comprising processor means responsive to the plurality of receivers for providing a plurality of power level signals each representing a power level for a respective one of the detected signals and a plurality of chip delay signals each representing a chip delay of a respective one of the detected signals relative to a reference one of the bit clocks,
the correlation means of the plurality of receivers each being responsive to parameters derived from said power level signals and said chip delay signals in correlating its own spreading code sequence with the received signal.

2. Apparatus as claimed in claim 1, wherein said processor means provides said power level signals as signal-to-noise ratio (SNR) signals with respect to a common background noise level that is substantially absent multiple-access interference.

3. Apparatus as claimed in claim 1, wherein the correlator unit comprises a first matched filter, a second matched filter and means for subtracting the output of the second matched filter from the output of the first matched filter and supplying the resulting difference signal as the output of the correlator unit, the first matched filter having coefficients corresponding to the spreading sequence of the signal to be detected, the second matched filter having adjustable coefficients, the apparatus further comprising means for adjusting the coefficients of the second matched filter in dependence upon the parameters.

4. Apparatus as claimed in claim 1, wherein the correlator unit comprises a matched filter having adjustable coefficients and means for adjusting the coefficients in dependence upon said parameters.

5. Apparatus as claimed in claim 1, further comprising processor means responsive to the detected signals and bit clocks from all of the receivers to provide said signal-to-noise ratio (SNR) signals for all of the detected signals, the processor means being arranged to derive a set of chip intervals corresponding to sub-divisions of a chip of the reference signal and determine, for each chip interval, net SNR values of those detected signals having chip delays, relative to the bit clock of the reference signal, corresponding to that particular interval.

6. Apparatus as claimed in claim 1, wherein all bits of the digital signal are encoded by the same spreading code segment.

7. A method of demodulating signals received at a reception station of a code division multiple access (CDMA) communications system comprising a plurality of CDMA transmitters coupled to such reception station apparatus by a communications channel, each transmitter being arranged to encode a respective one of a corresponding plurality of digital signals with a spreading code unique to that transmitter, each bit of the digital signal being encoded by a spreading code comprising a multiplicity of elements to provide a corresponding multiplicity of chips, all of the transmitters transmitting their respective encoded signals to the reception station asynchronously via the communications channel so as to occupy the same bandwidth, the reception station comprising a plurality of receivers corresponding to at least a subset of the transmitters, the receivers being connected to receive, in common, a received signal comprising all of the encoded signals from the plurality of transmitters, the method comprising the steps of correlating the received signal, in each receiver, with the spreading code sequence of the corresponding transmitter to provide a detected signal for that receiver, sampling the detected signal to provide an estimated digital signal, and extracting from each detected signal a bit clock in dependence upon the timing of the detected signal;

processing output signals from the plurality of receivers of processing signals output from the plurality of receivers to provide a plurality of power level signals each representing a power level for a respective one of the detected signals and a plurality of chip delay signals each representing a chip delay of a respective one of the detected signals relative to a reference one of the bit clocks, the correlation step in each of the plurality of receivers using parameters derived from said power level signals and said chip delay signals.

8. A method as claimed in claim 7, wherein the detected signals and bit clocks from all of the receivers are processed to provide said power level signals as signal-to-noise ratio (SNR) signals with respect to a common background noise level that is substantially absent multiple access interference.

9. A method as claimed in claim 8, wherein the correlating step is performed using a first matched filter and a second matched filter, the first matched filter having coefficients corresponding to the spreading sequence of the signal to be detected, the second matched filter having adjustable coefficients, the detected signal being derived by subtracting the output of the second matched filter from the output of the first matched filter, the method further comprising the step of adjusting the coefficients of the second matched filter in dependence upon the parameters.

10. A method as claimed in claim 7, wherein the correlating step is performed using a matched filter unit having adjustable coefficients and includes the step of adjusting the coefficients of the matched filter unit in dependence upon said parameters.

11. A method as claimed in claim 7, wherein the correlating step includes the steps of deriving a set of chip intervals corresponding to sub-divisions of a chip of the reference signal, determining, for each chip interval, net SNR values of those detected signals having chip delays, relative to the bit clock of the reference signal, corresponding to that particular interval, and using the SNR values to suppress corresponding multi-access interference when correlating the received signal.

12. A method as claimed in claim 7, wherein all bits of the digital signal are encoded by the same spreading code segment.

13. Apparatus as claimed in claim 1, wherein each correlator means comprises a correlator with adjustable coefficients and each of the receivers further comprises sorting means for sorting the power level signals and chip delay signals to provide an estimate of power level for each of the detected signals other than its own, and coefficient computing means for adjusting the coefficients of the correlator in dependence upon the sorted power levels.

14. Apparatus as claimed in claim 1, wherein each transmitter comprises means for encoding each of a plurality of bits of said digital signal by a respective one of a plurality of different segments of a long spreading code and each correlation means correlates the received signal with each of a corresponding plurality of said segments in turn to detect said digital signal.

15. A method as claimed in claim 7, wherein, at each receiver, the correlation is done using a correlator with adjustable coefficients and the method further comprises the steps of sorting the power level signals and chip delay signals to provide an estimate of power level for each of the detected signals of the other receivers, and adjusting the correlation coefficients in dependence upon the sorted signals.

16. A method as claimed in claim 7, for demodulation of received signals in a system in which, in each transmitter, each of a plurality of bits of said digital signal is encoded by a respective one of a plurality of different segments of a long spreading code, the method comprising the steps of, in each receiver, correlating the received signal with each of a corresponding plurality of said segments in turn to detect the bits of said digital signal.

* * * * *